(12) United States Patent
Groenewegen et al.

(10) Patent No.: US 11,853,746 B2
(45) Date of Patent: Dec. 26, 2023

(54) SOURCE CODE MERGE CONFLICT RESOLUTION

(71) Applicant: Microsoft Technology Licensing, LLC, Redmond, WA (US)

(72) Inventors: Peter Groenewegen, Sammamish, WA (US); Mark Alistair Wilson-Thomas, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/683,719

(22) Filed: Mar. 1, 2022

(65) Prior Publication Data
US 2023/0281005 A1    Sep. 7, 2023

(51) Int. Cl.
*G06F 8/70* (2018.01)
*G06F 11/36* (2006.01)
*G06F 8/41* (2018.01)

(52) U.S. Cl.
CPC .................. *G06F 8/70* (2013.01); *G06F 8/41* (2013.01); *G06F 11/3688* (2013.01)

(58) Field of Classification Search
CPC ........... G06F 8/70; G06F 8/41; G06F 11/3688
USPC .................................................. 717/105–121
See application file for complete search history.

(56) References Cited

U.S. PATENT DOCUMENTS

| | | | | |
|---|---|---|---|---|
| 5,860,007 A * | 1/1999 | Soni | ........................... | G06F 8/70 |
| | | | | 717/121 |
| 6,397,378 B1 * | 5/2002 | Grey | .................... | G06F 11/3688 |
| | | | | 717/175 |
| 6,678,882 B1 * | 1/2004 | Hurley | .................... | G06F 8/315 |
| | | | | 717/121 |
| 7,131,112 B1 * | 10/2006 | Bartz | ........................ | G06F 8/71 |
| | | | | 717/122 |
| 7,322,024 B2 * | 1/2008 | Carlson | ..................... | G06F 8/36 |
| | | | | 707/999.103 |
| 8,171,454 B2 * | 5/2012 | Sreedhar | ................. | G06F 8/315 |
| | | | | 717/116 |
| 8,412,813 B2 * | 4/2013 | Carlson | ..................... | G06F 8/36 |
| | | | | 709/224 |
| 8,566,789 B2 * | 10/2013 | Siddaramappa | ........ | G06F 16/80 |
| | | | | 707/765 |

(Continued)

OTHER PUBLICATIONS

Yuzuki "How We Resolve Conflict: An Empirical Study of Method-Level Conflict Resolution", IEEE, pp. 21-24 (Year: 2015).*

(Continued)

*Primary Examiner* — Anil Khatri
(74) *Attorney, Agent, or Firm* — Ogilvie Law Firm

(57) ABSTRACT

Some embodiments automatically assess source code merge conflict resolution candidates and then display a recommendation explaining strengths and weaknesses of each candidate. Thus informed, a developer can avoid adopting changes which produce merged code that does not build or does not pass tests, and avoid merged code that departs from a pattern followed in previous changes to a code base. Candidate conflict resolution assessments depend on objective criteria such as merged code buildability, operational accuracy, edit pattern consistency, or conflict resolution generator confidence. Candidates may be automatically ranked, prioritized, or rejected outright by an embodiment. Work item descriptions and candidate provenance may be displayed to aid developer selection of an optimal merge candidate.

20 Claims, 4 Drawing Sheets

---

ENHANCED SYSTEM 102, 202 WITH MERGE CONFLICT RESOLUTION FACILITATION FUNCTIONALITY 210

MEMORY/MEDIA 112, 114

MERGE CONFLICT RESOLUTION FACILITATION SOFTWARE 302 TO OBTAIN CANDIDATE RESOLUTIONS 304, 208, ASSESS CANDIDATES, FORMULATE AND DISPLAY RECOMMENDATION 306

ASSESSMENT CRITERIA 308 SET 310: BUILDABILITY 312, ACCURACY 314, CONSISTENCY 316, CONFIDENCE 318

RANKING 320

PROCESSOR 110    RECOMMENDATION PRIORITY 322    INTERFACE(S) 324

(56) References Cited

U.S. PATENT DOCUMENTS

| | | | | |
|---|---|---|---|---|
| 8,694,965 | B2* | 4/2014 | Eykholt | G06F 8/73 |
| | | | | 717/122 |
| 9,069,644 | B2* | 6/2015 | Melski | G06F 9/44505 |
| 9,128,804 | B2* | 9/2015 | Gores | G06F 8/71 |
| 9,665,359 | B2* | 5/2017 | Thomas | G06F 8/62 |
| 9,760,862 | B2* | 9/2017 | Bailor | G06Q 10/10 |
| 9,843,624 | B1* | 12/2017 | Taaghol | G06F 21/53 |
| 11,294,935 | B2* | 4/2022 | Stigsen | G06F 7/14 |
| 2015/0220332 | A1 | 8/2015 | Bernstein et al. | |
| 2015/0268948 | A1* | 9/2015 | Plate | G06F 21/577 |
| | | | | 717/123 |
| 2022/0398462 | A1* | 12/2022 | Clement | G06N 3/08 |

OTHER PUBLICATIONS

Koegel et al, "Operation-based conflict detection and resolution", IEEE, pp. 43-48 (Year: 2009).*

Niu et a, "A Cost-Benefit Approach to Recommending Conflict Resolution for Parallel Software Development", IEEE, pp. 21-25 (Year: 2012).*

Ahmed et al, "An Empirical Examination of the Relationship Between Code Smells and Merge Conflicts", IEEE, pp. 58-67 (Year: 2017).*

Seibt et al, "Leveraging Structure in Software Merge: An Empirical Study", IEEE, pp. 4590-4610 (Year: 2022).*

Towqir et al, "Detecting Build Conflicts in Software Merge for Java Programs via Static Analysis" ACM, pp. 1-13 (Year: 2022).*

Estler et al, "Awareness and Merge Conflicts in Distributed Software Development", IEEE, pp. 26-35 (Year: 2014).*

"Get started with unit testing", retrieved from <<https://docs.microsoft.com/en-us/visualstudio/test/getting-started-with-unit-testing?view=vs-2022&tabs=dotnet%2Cmstest>>, Dec. 16, 2021, 11 pages.

"Addressing merge conflicts", retrieved from <<https://docs.github.com/en/pull-requests/collaborating-with-pull-requests/addressing-merge-conflicts>>, no later than Feb. 3, 2022, 1 page.

Arthur Sultanbekov, "My favorite tools to resolve git merge conflicts", retrieved from <<https://blog.xoxzo.com/2019/03/29/my-favorite-tools-to-resolve-git-merge-conflicts/>>, Mar. 29, 2019, 5 pages.

"MergeResolver—Automatic Merge Conflict Resolution", retrieved from <<https://blogs.grammatech.com/mergeresolver-automatic-merge-conflict-resolution>>, Jun. 22, 2020, 8 pages.

Gleiph Ghiotto, et al., "On the Nature of Merge Conflicts: a Study of 2,731 Open Source Java Projects Hosted by GitHub", retrieved from <<http://www.ic.uff.br/~leomurta/papers/ghiotto2018.pdf>>, 2018, 25 pages.

Sten Pittet, "An introduction to code coverage", retrieved from <<https://www.atlassian.com/continuous-delivery/software-testing/code-coverage>>, no later than Feb. 3, 2022, 10 pages.

"Use code coverage to determine how much code is being tested", retrieved from <<https://docs.microsoft.com/en-us/visualstudio/test/using-code-coverage-to-determine-how-much-code-is-being-tested?view=vs-2022>>, Aug. 5, 2021, 10 pages.

"View and add work items using the Work Items page", retrieved from <<https://docs.microsoft.com/en-us/azure/devops/boards/work-items/view-add-work-items?view=azure-devops&tabs=browser>>, Nov. 9, 2021, 12 pages.

Rahmani, et al., "Multi-modal Program Inference: A Marriage of Pre-trained Language Models and Component-Based Synthesis", In Proceedings of the ACM on Programming Languages, vol. 5, Issue OOPSLA, Article 158, Oct. 15, 2021, 29 pages.

"Tutorial", retrieved from <<https://microsoft.github.io/prose/documentation/prose/tutorial/>>, no later than Apr. 1, 2020, 13 pages.

"International Search Report and Written Opinion Issued in PCT Application No. PCT/US22/052482", dated Mar. 30, 2023, 12 Pages.

* cited by examiner

SOURCE CODE MERGE CONFLICT RESOLUTION

BACKGROUND

Noon During computer software development, different developers sometimes work on respective copies of the same source code, e.g., after each developer checks out a respective copy of the source code from a version control system. The changes made in different copies may be inconsistent in a wide variety of ways. For example, in one copy a given function may have two parameters whereas in another copy the same function has three parameters. A given variable may be defined as an integer type in one copy and as a floating point type in another copy. A library may be imported and used in one copy but not be imported or used in another copy. Some adjacent lines of source code may appear inline at several locations in one copy but appear only once, in the body of a newly defined function, in another copy. Many other inconsistencies may also occur when changes are made in different source code copies. Some inconsistencies are simple and easy to reconcile, but others may give rise to more complex merge conflicts when an attempt is made to merge all the changes together to create a single new version of the source code.

Advances are still possible in the technology for resolving source code merge conflicts. Advances may provide or enhance previously available benefits of various approaches to source code merge conflict resolution.

SUMMARY

Some embodiments described herein facilitate the use of automatically generated source code merge conflict resolutions by automatically assessing resolution candidates and displaying a resolution candidate recommendation. An embodiment may thus facilitate efficient interaction between a developer and a computing system which is being used for software development. For instance, the developer can avoid adopting changes which result in source code that does not build, or source code that builds but does not pass an existing test suite. In response to the conflict resolution recommendation, the developer may also avoid adopting changes that are inconsistent with previous changes to a code base and therefore more likely to lead to further changes later that could have been avoided, without sacrificing code functionality, by selection of a different conflict resolution.

Some embodiments obtain multiple candidate merge conflict resolutions which are each associated with a source code base. An embodiment may then assess each candidate merge conflict resolution using an automated assessment based on assessment criteria such as a buildability criterion, an accuracy criterion, a consistency criterion, or a resolution generator confidence criterion. Based on the assessment results, a given candidate merge conflict resolution may be assigned a recommendation priority, such as "reject", "test further", or "rank relative to other suitable candidates". Then a recommendation of zero or more candidate merge conflict resolutions may be displayed to the developer to facilitate an informed response to the candidate resolutions.

In some embodiments, a merge conflict resolutions recommendation may describe the characteristics of different candidate resolutions, such as whether they will result in code that compiles and builds, which tests they pass, which gaps in testing they reveal, whether they are consistent with earlier edit patterns in this code base, how they are described in a work item management tool, their provenance, or the confidence value assigned to them by the machine learning model, language model, or other mechanism that generated them. In response, a developer may select a particular conflict resolution to implement as code changes are merged, or the developer may pursue a different conflict resolution in view of the displayed characteristics of the candidate resolutions.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
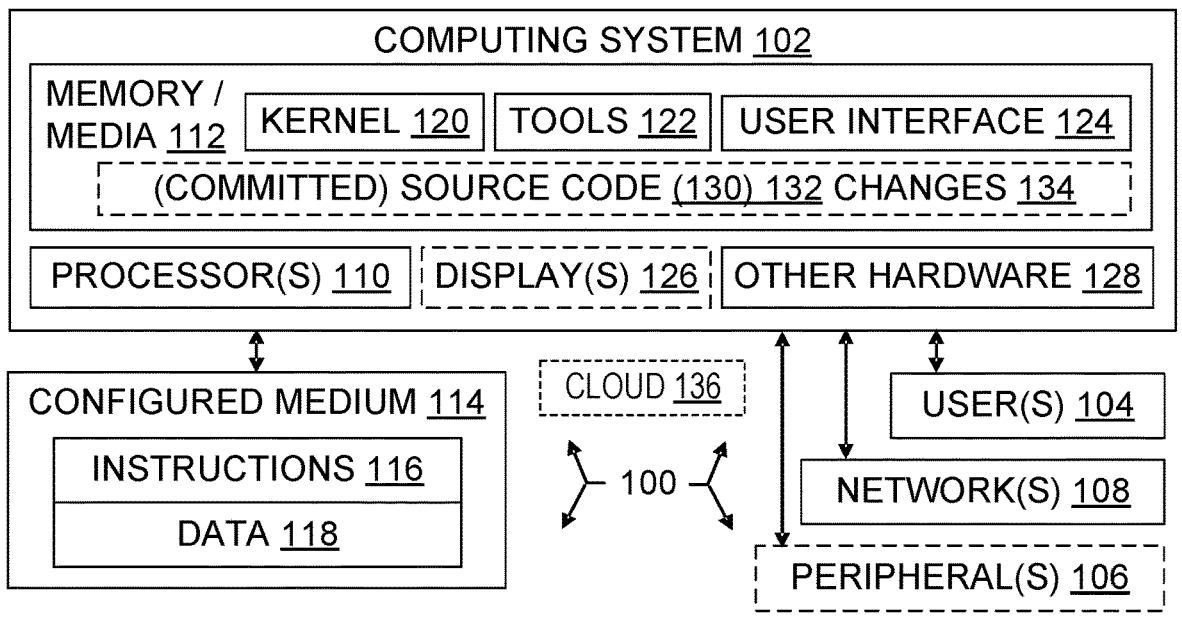
FIG. 1 is a block diagram illustrating computer systems and also illustrating configured storage media.

Innovations may expand beyond their origins, but understanding an innovation's origins can help one more fully appreciate the innovation. In the present case, some teachings described herein were motivated by technical challenges arising from the automated generation of merge conflict resolution possibilities. Source code merge conflicts often arise in connection with the use of a source code repository or another source code version control mechanism. Merge conflicts were originally resolved largely or entirely in an ad hoc manner by individual developers with little or no automation assistance. This could be very time-consuming and difficult for the developers involved.

More recently, technology has become available to automatically generate merge conflict resolution possibilities.

Some merge conflict resolution generators employ adaptations of machine learning models such as GPT-C; some employ program code synthesizers may use Microsoft PROSE™ technology or another program synthesis technology (mark of Microsoft Corporation). This is not meant to be a comprehensive list of merge conflict resolution generator technologies. A focus herein is not on how merge conflict resolutions are generated, but rather on how to make efficient and effective use of generated merge conflict resolutions.

In particular, Microsoft innovators explored ways to help developers choose a suitable merge conflict resolution from among multiple automatically generated possibilities. The innovators recognized that with the increasing availability of automatically generated conflict resolutions, a developer might often be asked to choose from multiple merge conflict resolution possibilities. Multiple proposed resolutions might be received from different resolution generators, or from a single generator using different aspects of a given set of changes as inputs, or even in some situations from a single generator using a single pair of inconsistent changes as the input. This recognition led to the technical challenge of determining automatically and efficiently which merge conflict resolution possibilities to recommend to a developer, and the associated challenge of how to support that recommendation with technical information that the developer would consider helpful.

Embodiments here address these challenges, in the form of various merge conflict resolution functionalities which utilize specific technical suitability assessment criteria for assessing different merge conflict resolution possibilities. Recommendations are automatically formulated on the basis of assessment results, and are displayed to a developer. Even if the developer does not adopt any of the automatically generated resolutions, by displaying them together with their assessment results a developer is given actionable technical guidance on the consequences of including or excluding particular changes from the ultimately implemented merge conflict resolution. For example, a recommendation may indicate that particular changes prevent compilation, lead to unit test failure, are not covered by existing tests, or run counter to recent refactoring. Accordingly, the conflict resolution recommendation functionality helps increase developer productivity by helping developers avoid source code changes that would have unwanted results.

One of skill informed by the teachings herein will recognize the advantages of those teachings over alternative merge conflict resolution approaches, such as those relying on ad hoc resolutions, which create inconsistency, or rigid approaches, which provide much less guidance to developers. One rigid approach is for a developer A to always accept and build the other developer's changes first and then try to recreate A's own changes in the resulting code. But in doing so, A fails to receive guidance as to the accuracy and consistency of the other developer's changes. By contrast, embodiments taught herein provide such guidance via assessments 904 and recommendations 306 that report assessment results.

Operating Environments

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 136. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 may interact with a computer system 102 user interface 124 by using displays 126, keyboards 106, and other peripherals 106, via typed text, touch, voice, movement, computer vision, gestures, and/or other forms of I/O. Virtual reality or augmented reality or both functionalities may be provided by a system 102. A screen 126 may be a removable peripheral 106 or may be an integral part of the system 102. The user interface 124 may support interaction between an embodiment and one or more human users. The user interface 124 may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of human user 104. Automated agents, scripts, playback software, devices, and the like running or otherwise serving on behalf of one or more humans may also have accounts, e.g., service accounts. Sometimes an account is created or otherwise provisioned as a human user account but in practice is used primarily or solely by one or more services; such an account is a de facto service account. Although a distinction could be made, "service account" and "machine-driven account" are used interchangeably herein with no limitation to any particular vendor.

Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a cloud 136 and/or other network 108 via network interface equipment, for example.

Each computer system 102 includes at least one processor 110. The computer system 102, like other suitable systems, also includes one or more computer-readable storage media 112, also referred to as computer-readable storage devices 112. Source code 132 may include code 130 which has been committed in a version control system 122, or code 132 not thus committed, and may include changes 134 relative to other versions of the code. Code 130, 132 and constituent changes 134 may reside in media 112 within a system 102. Tools 122 may include software apps on mobile devices 102 or workstations 102 or servers 102, as well as APIs, browsers, or webpages and the corresponding software for protocols such as HTTPS, for example.

Storage media 112 may be of different physical types. The storage media 112 may be volatile memory, nonvolatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable nonvolatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, TPUs, GPUs, and/or quantum processors), memory/storage media 112, peripherals 106, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software-defined network or a sandboxed or other secure cloud computing environment. In some embodiments, one or more computers are partially or fully "air gapped" by reason of being disconnected or only intermittently connected to another networked device or remote cloud. In particular, source code merge conflict resolution functionality could be installed on an air gapped network and then be updated periodically or on occasion using removable media 114. A given embodiment may also communicate technical data and/or technical instructions through direct memory access, removable or non-removable volatile or nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that any items which are not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

Figure 2:
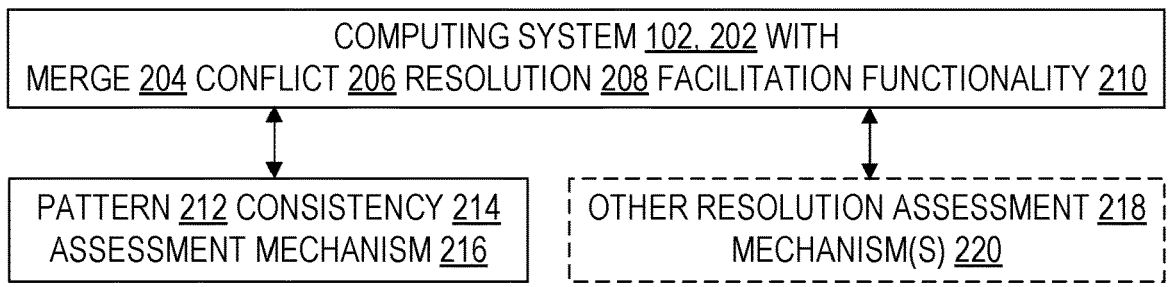
FIG. 2 is a block diagram illustrating aspects of a computing system which has one or more of the source code merge conflict resolution enhancements taught herein.

FIG. 2 illustrates a computing system 102 configured by one or more of the source code merge conflict resolution enhancements taught herein, resulting in an enhanced system 202. This enhanced system 202 may include a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
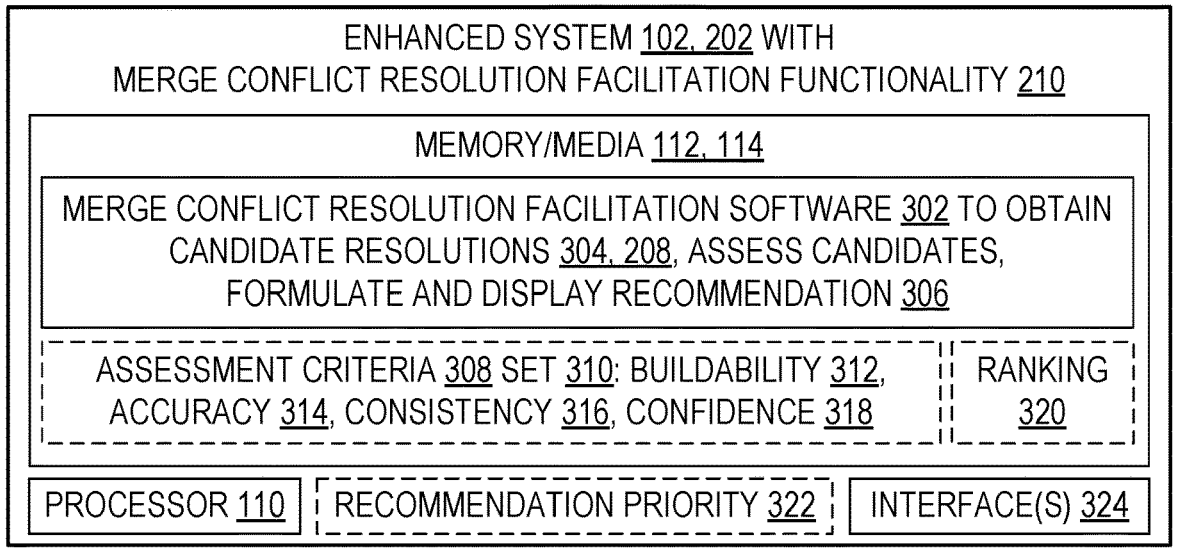
FIG. 3 is a block diagram illustrating an enhanced system configured with source code merge conflict resolution facilitation functionality.

FIG. 3 illustrates an enhanced system 202 which is configured with source code merge conflict resolution facilitation software 302 to provide source code merge conflict resolution facilitation functionality 210. "Facilitation" merely emphasizes that a resolution need not actually be applied to resolve a conflict in order for a developer or entity to benefit from teachings herein. Conflict resolution recommendations 306 and other FIG. 3 items are discussed at various points herein, and additional details regarding them are provided in the discussion of a List of Reference Numerals later in this disclosure document.

Figure 4:
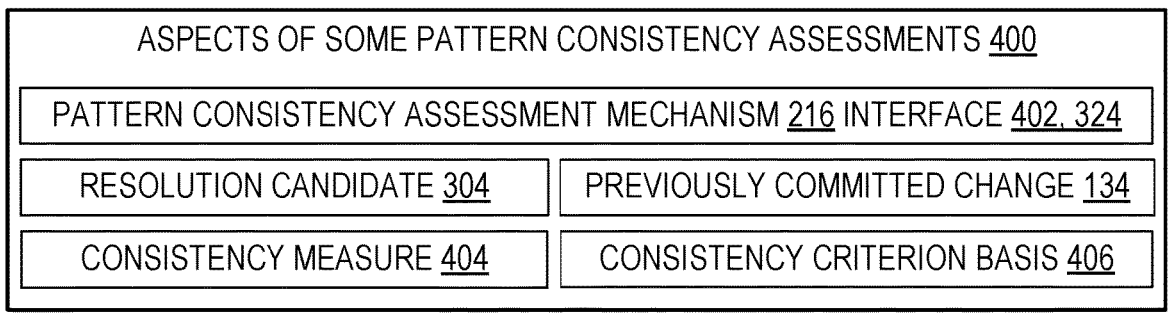
FIG. 4 is a block diagram illustrating aspects of some source code editing pattern consistency assessments.

FIG. 4 shows some aspects of edit pattern consistency assessments 400. This is not a comprehensive summary of all edit patterns 212, or all aspects of edit pattern consistency 214, or all edit pattern consistency assessment mechanisms 216 for potential use in merge conflict resolution 208. FIG. 4 items are discussed at various points herein, and additional details regarding them are provided in the discussion of a List of Reference Numerals later in this disclosure document.

Figure 5:
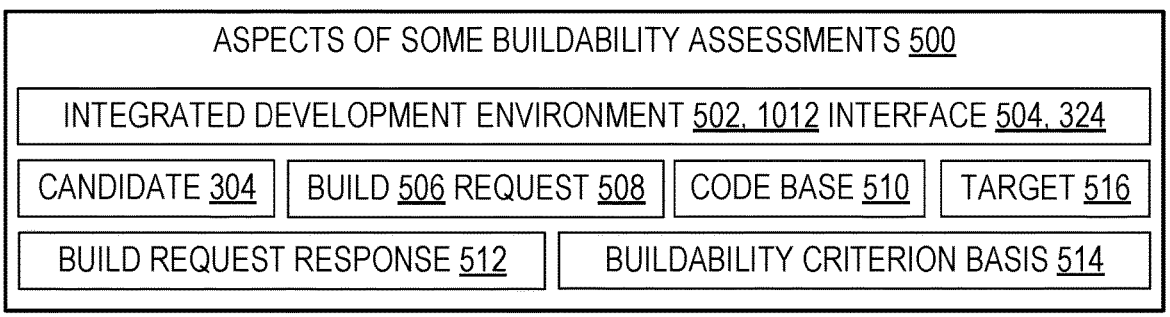
FIG. 5 is a block diagram illustrating aspects of some program buildability assessments.

FIG. 5 shows some aspects of program buildability assessments 500. This is not a comprehensive summary of all programs 120, 122, 132, 516, 612 or of all aspects of software builds 506, or of all buildability assessment mechanisms 1012 for potential use in merge conflict resolution 208. FIG. 5 items are discussed at various points herein, and additional details regarding them are provided in the discussion of a List of Reference Numerals later in this disclosure document.

Figure 6:
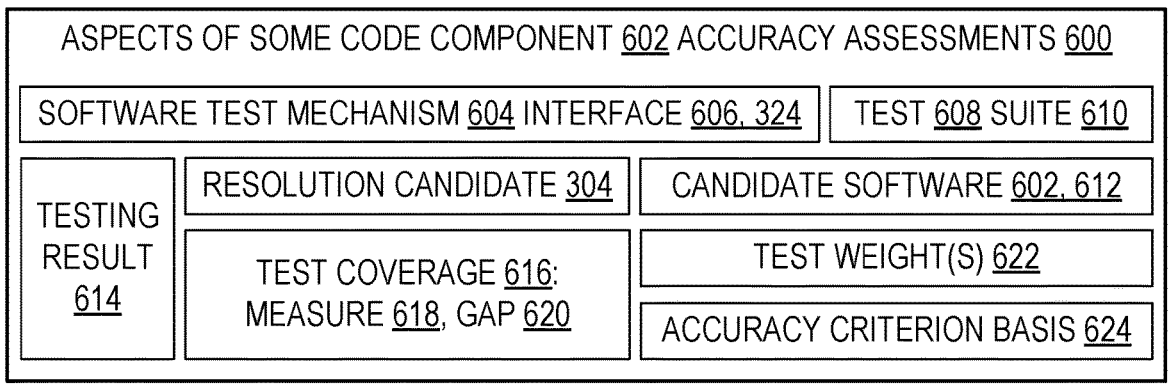
FIG. 6 is a block diagram illustrating aspects of some built code operational accuracy assessments.

FIG. 6 shows some aspects of code component accuracy assessments 600. This is not a comprehensive summary of all code 120, 122, 132, 602, or all aspects of software testing 608, or all code component accuracy assessment mechanisms 604 for potential use in merge conflict resolution 208. FIG. 6 items are discussed at various points herein, and additional details regarding them are provided in the discussion of a List of Reference Numerals later in this disclosure document.

Figure 7:
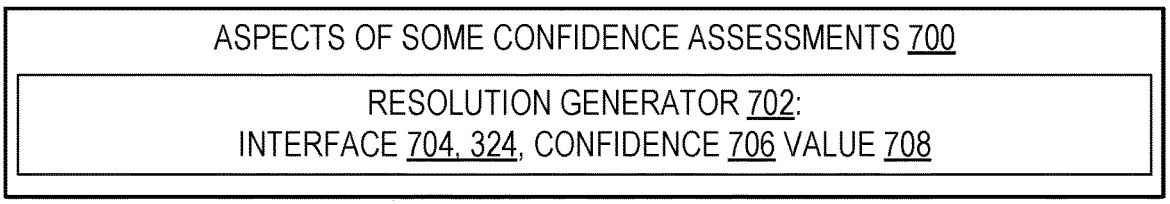
FIG. 7 is a block diagram illustrating aspects of some merge conflict resolution generator-assigned confidence assessments.

FIG. 7 shows some aspects of resolution generator confidence assessments 700. This is not a comprehensive summary of merge conflict resolution generators 702, or all aspects of merge conflict resolution generation 1028, or all values 708 for potential use in merge conflict resolution 208. FIG. 7 items are discussed at various points herein, and additional details regarding them are provided in the discussion of a List of Reference Numerals later in this disclosure document.

Figure 8:
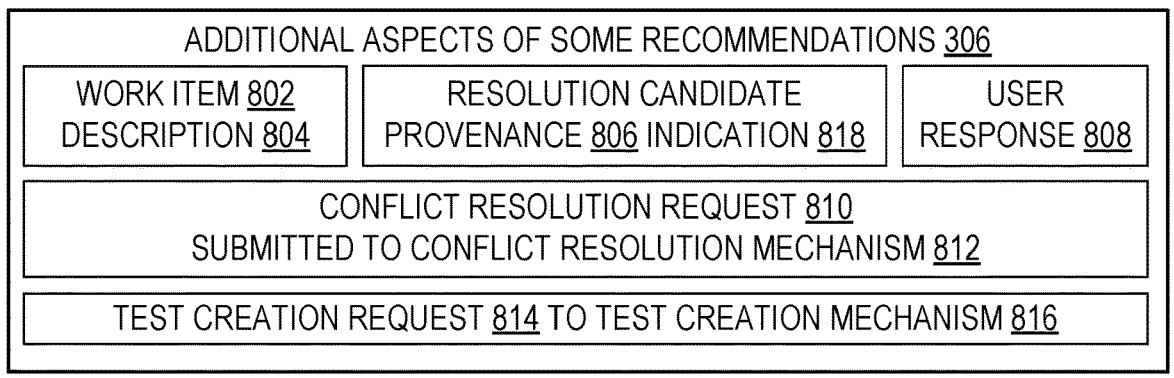
FIG. 8 is a block diagram illustrating some additional aspects of some merge conflict resolution recommendations.

FIG. 8 shows some aspects of source code merge conflict resolution recommendations 306. This is not a comprehensive summary of all aspects of conflict resolution recommendations 306, or of all operations or mechanisms for potential use in merge conflict resolution 208. FIG. 8 items are discussed at various points herein, and additional details regarding them are provided in the discussion of a List of Reference Numerals later in this disclosure document.

In some embodiments, the enhanced system 202 may be networked through an interface 324. An interface 324 may include hardware such as network interface cards, software such as network stacks, APIs, or sockets, combination items such as network connections, or a combination thereof.

In some embodiments, an enhanced system 202 includes a computing system 202 which is configured to facilitate source code merge conflict resolution. The enhanced system 202 includes a digital memory 112 and a processor 110 in operable communication with the memory. The digital memory 112 may be volatile or nonvolatile or a mix. The processor 110 is configured to perform source code merge conflict resolution facilitation steps. The steps include (a) obtaining 902 at least two candidate 304 merge conflict resolutions 208, (b) assessing 904 each candidate merge conflict resolution using an assessment subset 1050 of a predefined set 310 of assessment criteria 308, the predefined set comprising a buildability criterion 312, an accuracy criterion 314, and a consistency criterion 316, the assessment subset 1050 including at least the consistency criterion 316, (c) ranking 910 at least two candidate merge conflict resolutions relative to one another based on a result of the assessing 904, and (d) displaying 914 a recommendation 306 based on the ranking.

As for technical benefits, displaying 914 a ranking 320 of merge conflict resolution candidates 304 based on automated assessments 904 beneficially improves developer productivity by informing the developer of candidates whose adoption will likely involve more subsequent development time and effort than other resolution candidates. For instance, adopting candidates that lead to code which does not build (per buildability criterion 312) will likely involve further debugging to remove the build obstacles. Adopting candidates that lead to code which does not pass testing (per accuracy criterion 314) will likely involve further debugging or functionality additions to pass the tests 608. Adopting candidates that lead to code which is inconsistent with prior edits (per consistency criterion 316) will likely involve refactoring to bring the code in conformance, or create developer confusion because the code departs from familiar coding guidelines or practices. By contrast, a resolution that includes more likely instances of a repeated pattern found elsewhere in the same merge, or in prior committed merges to the code base, is more likely to be optimal than one that does not include those instances.

As an example, in a Scenario A three candidates C1, C2, and C3 are obtained 902, and the system includes code 116, 118 for implementing a set 310 consisting essentially of a buildability criterion 312 and a consistency criterion 316. The phrase "consisting essentially" here does not prevent the system from checking against other criteria generally, it merely rules out in this example any requirement to use an accuracy criterion 314 or a confidence criterion 318.

In Scenario A, assessment 904 of C1 results in compilation errors. That is, code produced by resolving the merge conflict using candidate C1 does not compile.

Assessment 904 of C2 results 512 in no compilation errors or other detected build 506 errors. Thus, the linking of all object modules succeeds, all imported libraries are found, all referenced resources 118 are found, no severe security risks are identified by an automatic code analysis performed while building, all necessary access permissions to build the intended program 516 are valid, and so on. However, assessment 904 also determines that code 132 produced by resolving the merge conflict using candidate C2 does not follow a previously established editing pattern 212, in that this code performs inline a sequence of operations that previous edits had pulled into a function foo( ). Consistency with the established pattern 212 would involve calling foo( ) instead of repeating the body of foo( ) inline.

Assessment 904 of C3 results in no detected build errors and no detected inconsistencies with any established editing pattern 212. Accordingly, in this example Scenario A, the embodiment displays 914 a recommendation which includes information such as:

| C1: | Build failed | Consistency not checked |
| C2: | Build succeeded | Consistency check failed; foo() not called |
| C3: | Build succeeded | Consistency check passed |

Suggested merge(s): C3

As another example, in a Scenario B four candidates C1, C2, C3, and C4 are obtained 902. C1 and C2 were generated 1028 by a first resolution generator G1, whereas C3 and C4 were generated 1028 by a second resolution generator G2. C1 and C2 have respective confidence values 708 provided by generator G1, whereas C3 and C4 have no respective confidence values 708 because generator G2 is not configured to emit confidence values 708.

In this Scenario B embodiment, the system includes code 116, 118 for implementing a set 310 consisting essentially of a buildability criterion 312, a consistency criterion 316, and a confidence criterion 318. Assessment 904 indicates that all four candidates 304 build fine, and all four candidates 304 have no detected edit pattern inconsistencies. Accordingly, in this example scenario the embodiment displays 914 a recommendation which includes information such as shown below. In the ranking 320 shown, C2 is best, C1 is next best, and C3 ties with C4 for the least optimal:

| C1: | Build OK | Consistency OK | Confidence 53% |
| --- | --- | --- | --- |
| C2: | Build OK | Consistency OK | Confidence 87% |
| C3: | Build OK | Consistency OK | Confidence unknown |
| C4: | Build OK | Consistency OK | Confidence unknown |

Merges ranked with best first: C2, C1, (C3 C4)

As another example, in a Scenario C five candidates C1, C2, C3, C4, and C5 are obtained 902. In this embodiment, the system includes code 116, 118 for implementing a set 310 consisting essentially of a buildability criterion 312, an accuracy criterion, and a consistency criterion 316. Assessment 904 indicates that all five candidates 304 build, and all five candidates 304 have no detected edit pattern inconsistencies.

However, different candidates 304 receive different operational accuracy test results 614. The test results 614 in this Scenario C example include not only which unit tests 608 were passed or failed by code 132 based on a given merge resolution candidate, but also how much 618 of that code is covered 616 by the test suite 610. Although it is not shown expressly here, due to restrictions on hyperlinks in patent documents, a displayed recommendation 306 may include hyperlinks to additional information, e.g., a copy of the merged code with portions colored in the display to indicate test coverage 616 of the merged code and to visually highlight coverage gaps 620.

In some cases, it may be deemed less important that the resolved code passes or fails tests if the tests don't adequately cover the resolved code. In this Scenario C example, ranking 910 is configured to prefer test passage to test coverage, to give test T1 greater weight than T2 and so on through T10 which has the least weight, to prefer greater coverage to lesser coverage when test passage is the same, and to treat coverage 616 as having an error of plus or minus 3%. Accordingly, in this example scenario the embodiment displays 914 a recommendation which includes information such as:

| C1: | Builds | IsConsistent | Fails T2, T7 Coverage 93% |
| --- | --- | --- | --- |
| C2: | Builds | IsConsistent | Fails T1, T7 Coverage 91% |
| C3: | Builds | IsConsistent | Fails T7 Coverage 37% |
| C4: | Builds | IsConsistent | Fails NONE Coverage 49% |
| C5: | Builds | IsConsistent | Fails NONE Coverage 61% |

Merge suggestion (best first): C5, C4, C3, C1, C2

These example scenarios are illustrative, not comprehensive. One of skill informed by the teachings herein will recognize that many other scenarios and many other variations are also taught. In particular, different embodiments or configurations may vary as to the criteria set 310, the assessment 904 criteria 308 and results, or the ranking 910 rules implemented, for example, yet still be within the scope of the teachings presented in this disclosure.

In some embodiments or configurations, sufficiently low ranked candidates 304 or candidates that are assigned 912 a "reject" recommendation priority 322 are rejected 908 such that they do not appear in the recommendation 306, or at least not in a displayed portion of the recommendation. A candidate X may be assigned a "reject" priority, e.g., if merge resolution using the candidate X results in code 132 that is at least twice as long as the shortest code resulting from other candidates, or if the provenance of X cannot be verified, or if the code from merging per X fails an automated security test. Other code 130 quality control policies may likewise be implemented in an embodiment using recommendation priorities 322.

In some embodiments, the candidate merge conflict resolutions 304 are associated with a source code base 510, and the computing system 202 includes a pattern consistency assessment mechanism interface 402 which is configured as an interface 324 to a pattern consistency assessment mechanism 216. In some of these, the assessing 904 includes: submitting 1004 to the pattern consistency assessment mechanism interface a candidate merge conflict resolution 304 and at least two committed changes 134 to the source code base; in response to the submitting, receiving 1006 from the pattern consistency assessment mechanism interface a consistency measure 404 which indicates an extent of consistency 214 of the submitted candidate merge conflict resolution with the committed changes; and utilizing 1008 the consistency measure as a basis 406 of the consistency criterion 316.

As to consistency assessment mechanisms 216, the Microsoft PROSE™ code synthesis technology, for example, may be configured to generate a regex to illustrate a difference between submitted codes, and then look for places where the regex could have been applied but wasn't. This capability can be adapted for consistency assessment 904 by comparing a merge resolution candidate or a portion thereof to the rest of the resolution candidate or to previous edits, such as previously committed changes 134, 130.

For instance, suppose five previously committed edits left a method foo( ) with three arguments (e.g., "foo(w, 7)"→"foo(w, 7, x+1)"). Suppose a candidate resolution C1 calls foo( ) with three arguments and a candidate resolution C2 calls foo( ) with four arguments. Then a ranking 910 might prefer C1 because it is more consistent with the earlier edits. PROSE™ technology 216 can detect the inconsistency if it is fed the earlier edits 134 and the proposed edits C1, C2.

In a Scenario D example, the pattern consistency assessment mechanism compares candidate C7 to a thousand prior edits, and determines automatically that six of the edits and C7 each involve an expression "((f−32)*9/5)". But in the six prior edits "((f−32)*9/5)" is replaced by "FtoC(f)" whereas in C7 it is not replaced. Hence, C7 is inconsistent with an edit pattern 212. The consistency measure 404 reporting the inconsistency may be implemented as Boolean, e.g., FALSE in this case meaning not consistent, or the consistency measure 404 may be implemented in a diff format containing the different texts, e.g., "pattern: ((f−32)*9/5)→FtoC(f) vs C7: ((f−32)*9/5)→((f−32)*9/5)", for instance. The diff format may also supplement the Boolean in some measure 404 embodiments or configurations. The consistency measure is utilized 1008 as a basis 406 of the consistency criterion 316 by making the consistency criterion 316 computationally dependent on the measure 404. This occurs, e.g., when the measure 404 has a computational effect via the consistency criterion 316 on a candidate rejection 908, a candidate rank 320, or a candidate priority 322.

In some embodiments, the candidate merge conflict resolutions 304 are associated with a source code base 510, and the computing system 202 includes an integrated development environment 502. In some of these, the assessing 904 includes: submitting 1010 a build request 508 to the integrated development environment, the build request requesting an attempt to perform a software build 506 using at least one candidate merge conflict resolution and at least a committed portion of the source code base; receiving 1014 a build request response 512 in response to submitting the build request; and utilizing 1016 the build request response as a basis 514 of the buildability criterion 312.

In a Scenario E example, the integrated development environment 502 (or in a variation another build mechanism 1012) tries to build a target program 516 using at least some of the code base 510 together with code resulting from a merge according to a candidate C6, and with code resulting from a merge according to a candidate C9, and with code resulting from a merge according to a candidate C10.

The build attempt using C6 merged code succeeds with no errors or warnings. The response 512 for C6 may be, e.g., a Boolean TRUE value and a link to the built program, or in a variation, only the Boolean TRUE value.

The build attempt using C9 merged code succeeds, but with warning messages from the build mechanism 1012 (e.g., from a compiler or a linker). The build response 512 for C9 may be, e.g., a Boolean TRUE value with a first hyperlink to the built program and a second hyperlink to a file containing the warning messages, or in a variation, this C9 response 512 may include only the Boolean TRUE value.

The build attempt using C10 merged code fails, with a compiler fatal error message. The build response 512 for C10 may be, e.g., a Boolean FALSE value with a hyperlink to a file containing the fatal error message, or in a variation, this C10 response 512 may include only the Boolean FALSE value.

In general, the build request response 512 is utilized 1016 as a basis 514 of the buildability criterion 312 by making the buildability criterion 312 computationally dependent on the response 512. This occurs, e.g., when the response 512 has a computational effect via the buildability criterion 312 on a candidate rejection 908, a candidate rank 320, or a candidate priority 322.

In some embodiments, the candidate merge conflict resolutions 304 are associated with a source code base 510, and the computing system 202 includes a testing interface 606 which is configured as an interface 324 to an automated software testing mechanism 604. In some of these, the assessing 904 includes: submitting 1018 to the testing interface a candidate software which was built using at least one candidate merge conflict resolution 304; in response to the submitting, receiving 1020 from the testing interface a testing result 614 which indicates a result of testing 608 of the candidate software by the automated software testing mechanism; and utilizing 1022 the testing result as a basis 624 of the accuracy criterion.

An example involving automated testing 608 as an accuracy criterion basis 624 is provided in Scenario C above. In general, the testing result 614 is utilized 1022 as a basis 624 of the accuracy criterion 314 by making the accuracy criterion 314 computationally dependent on the testing result 614. This occurs, e.g., when the testing result 614 has a computational effect via the accuracy criterion 314 on a candidate rejection 908, a candidate rank 320, or a candidate priority 322.

Other system embodiments are also described herein, either directly or derivable as system versions of described processes or configured media, duly informed by the extensive discussion herein of computing hardware.

Although specific merge conflict resolution architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different recommendation display 914 formats, types of edit pattern 212 inconsistency, build 506 targets 516, candidate 304 identifiers, ranking 910 rules, or priorities 322, for example, as well as other technical features, aspects, version controls, security controls, mechanisms, rules, criteria, expressions, hierarchies, operational sequences, data structures, environment or system characteristics, or other merge conflict resolution functionality 210 teachings noted herein, and may otherwise depart from the particular illustrative examples provided.

Processes (a.k.a. Methods)

Figure 9:
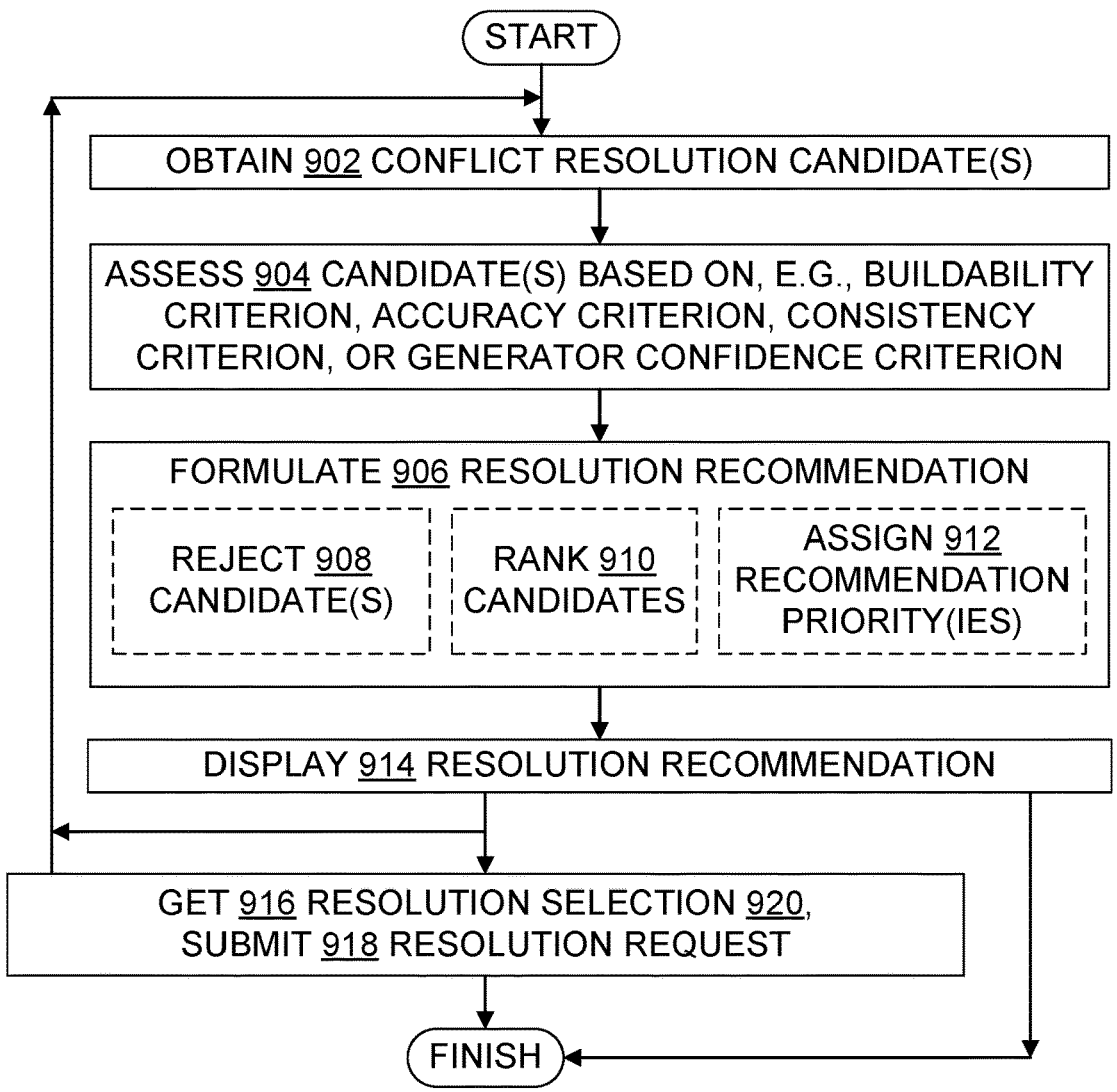
FIG. 9 is a flowchart illustrating steps in some merge conflict resolution methods.
Figure 10:
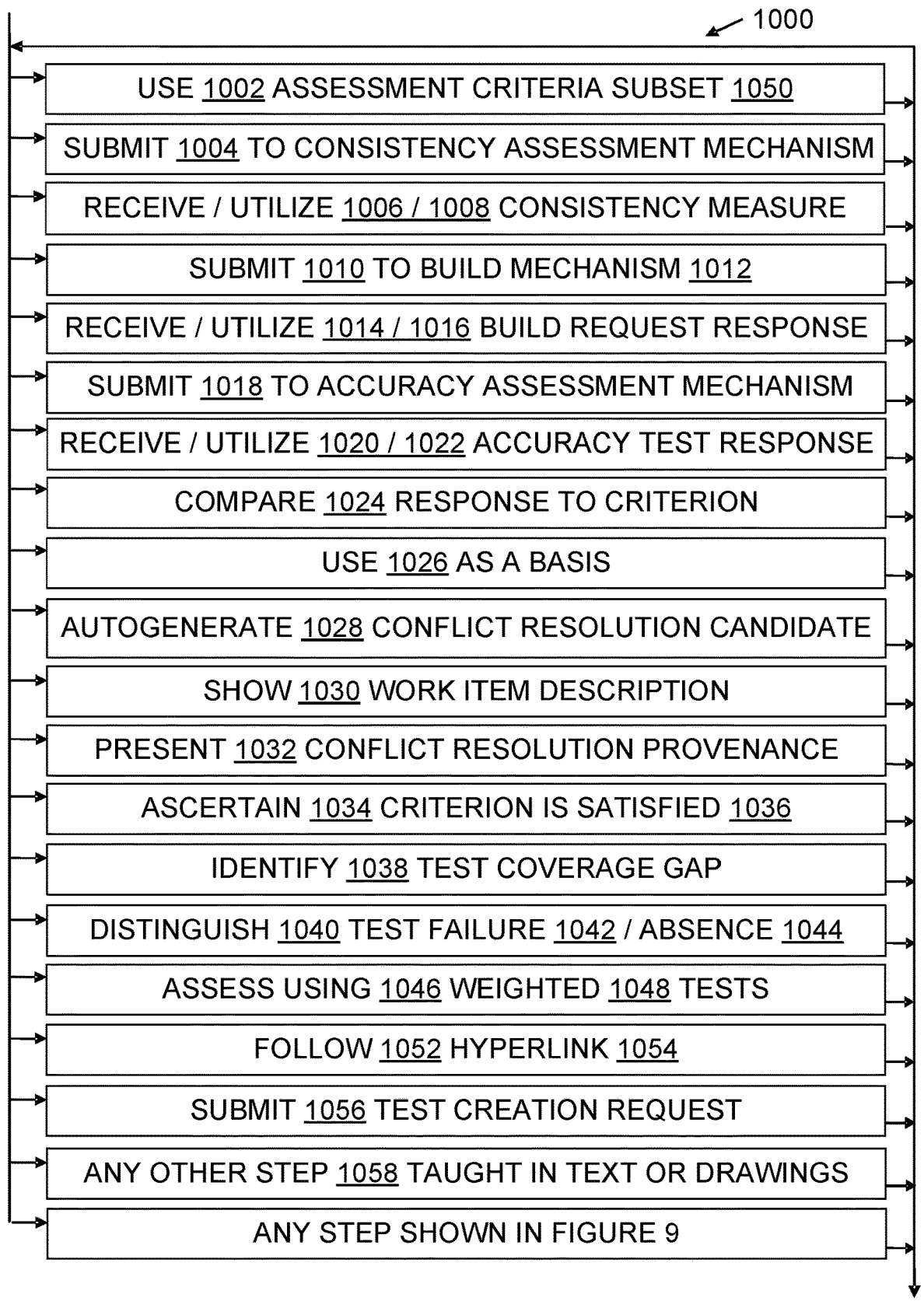
FIG. 10 is a flowchart further illustrating steps in some merge conflict resolution methods, incorporating FIG. 9.

Methods (which may also be referred to as "processes" in the legal sense of that word) are illustrated in various ways herein, both in text and in drawing figures. FIGS. 9 and 10 illustrate families of methods 900, 1000 that may be performed or assisted by an enhanced system, such as system 202 or another functionality 210 enhanced system as taught herein. FIG. 10 includes some refinements, supplements, or contextual actions for steps shown in FIG. 9, and incorporates the steps of FIG. 9 as options.

Technical processes shown in the Figures or otherwise disclosed will be performed automatically, e.g., by an enhanced system 202, unless otherwise indicated. Related processes may also be performed in part automatically and in part manually to the extent action by a human person is implicated, e.g., in some embodiments a human 104 may click on a hyperlink 1054 in a recommendation, commanding the browser or other tool 122 that displays 914 the recommendation to follow 1052 the hyperlink 1054 to a destination. But no process contemplated as innovative herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIGS. 9 and 10. Arrows in method or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 900 or 1000 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments address the challenge of selecting an optimal source code merge conflict resolution, where the details of optimality may vary from one embodiment or configuration to another but are primarily if not entirely objectively assessed. Some embodiments provide or utilize a method for facilitating source code merge conflict resolution, the method performed by a computing system, the method including: obtaining 902 a candidate merge conflict resolution, the candidate merge conflict resolution associated with a source code base; submitting 1004 the candidate merge conflict resolution and at least a portion of the source code base to a pattern consistency assessment mechanism; in response to the submitting, receiving 1006 from the pattern consistency assessment mechanism a consistency measure which indicates an extent of consistency 214 of the submitted candidate merge conflict resolution with the source code base portion; comparing 1024 the consistency measure 404 with a consistency criterion 316; and displaying 914 a recommendation 306 which associates the candidate merge conflict resolution with a result of the comparing. Scenarios A, B, C, and D herein include some examples in which the consistency 214 of a candidate merge resolution with prior edits is assessed 904.

In some embodiments, the method 1000 includes at least one of the following: assessing 904 the candidate merge conflict resolution 304 using a buildability criterion 312; or assessing 904 the candidate merge conflict resolution 304 using an accuracy criterion 314.

In some embodiments, the method 1000 includes obtaining 902 at least one additional candidate merge conflict resolution which is also associated with the source code base; assessing 904 the additional candidate merge conflict resolution using a buildability criterion 312 or an accuracy criterion 314 or both; ranking 910 at least two candidate merge conflict resolutions relative to one another, thereby producing a resolutions ranking 320; and displaying 914 the resolutions ranking.

In some embodiments, the obtaining 902 includes obtaining at least one automatically generated 1028 candidate merge conflict resolution. In some embodiments or configurations, a majority of the obtained candidates 304 were automatically generated 1028, and in some all of the obtained candidates 304 were automatically generated 1028.

In some embodiments, displaying 914 the recommendation includes showing 1030 a software development work item description 804 that is associated with the candidate merge conflict resolution 304. The work item description 804 may be displayed 914, 1030 at the same time as the rest of the recommendation. In a variation, the work item description 804 is displayed 914, 1030 after a command 808 is received to follow 1052 a hyperlink 1054 that leads to a work item 802 containing (possibly via another hyperlink) the description 804. The displayed description 804 may give a developer some guidance about the purpose or history of code changes 134 involved in a merge resolution candidate, e.g., "refactor to conform with switch to XYZ graphics library" or "remove normalization code that only supports discontinued vector scaling feature".

In some embodiments, displaying 914 the recommendation includes presenting 1032 a provenance indication 818 which indicates a provenance 806 of the candidate merge conflict resolution. For example, the provenance indication 818 may identify a particular individual developer, a particular development team, a particular online source, a particular public code base, or another person or entity or resource as being a source (or in a variation, the only source) of a change 134 that is involved in a merge resolution candidate. Some embodiments or configurations use color-coding for different code origins, e.g., to indicate this part of the merged code is from X and this other part is from Y.

In some embodiments, the method 1000 includes the following after obtaining 902 the candidate merge conflict resolution and prior to submitting 1004 the candidate merge conflict resolution and the portion of the source code base to the pattern consistency assessment mechanism: ascertaining 1034 that the candidate merge conflict resolution satisfies 1036 a buildability criterion 312; and then assessing 904 the candidate merge conflict resolution using an accuracy criterion 314. Thus, some embodiments order the assessments as a sequence with failure exits, whereas embodiments do not impose such an order. In some, the embodiment first assesses buildability, then assesses accuracy, and then assesses consistency. In particular candidate instances, if buildability fails then then accuracy and consistency of that candidate are not assessed, and if accuracy fails then the consistency of that candidate is not assessed. Assessment results may also be fed back into the resolution generator to improve the quality of generated resolution candidates.

Some embodiments report 914 edit pattern inconsistency even if the resolved code won't compile, or when it will compile but doesn't pass any unit tests. A developer may want to know about edit pattern inconsistency even when there are other problems with a candidate resolution, e.g., to monitor compliance with code 130 quality control policies. Similarly, one may expect unit tests to fail after functionality is added, so accuracy feedback may be particularly important.

In some embodiments, the method 1000 includes assessing the candidate merge conflict resolution using an accuracy criterion 314, and the accuracy criterion depends on a measurement 618 of code coverage by a test suite 610. An example is given in Scenario C.

In some embodiments, the method 1000 includes: assessing the candidate merge conflict resolution using an accuracy criterion, wherein the accuracy criterion depends on a measurement 618 of code coverage by a test suite 610; identifying 1038 a gap in test suite code coverage; and distinguishing 1040 in the recommendation between test failure 1042 and test absence 1044. For example, the discussion of Scenario C herein notes that a displayed recommendation 306 may include a copy of the merged code with portions colored to indicate test coverage 616 of the merged code and to visually highlight coverage gaps 620. The display could use a first color for code 132 that is covered and passed all tests 608 which exercised it, a second color for code 132 that is covered and failed at least one test 608 which exercised it, and a third color for code 132 that is not exercised (i.e., not covered) by any of the test suite 610.

In some embodiments, the method 1000 includes assessing 904 the candidate merge conflict resolution using an accuracy criterion 314, wherein the accuracy criterion depends 1046 on a test weight 622. Scenario C includes an example in which a test T1 is given 1048 greater weight than a test T2 and so on through a test T10 which has the least weight. However, different tests may also receive the same weight 622 as one another, e.g., tests T1 and T2 could each have a weight of thirty while tests T3 and T4 each have a weight of five. Test personnel and developers may assign 1048 test weights based on factors such as which tested functionality has access to mission critical data 118 or which tested functionality is most heavily used in production code, for example. Test weights might also be assigned by automation, e.g., based on a relevance measure as calculated using a machine learning model or static code analysis.

In some embodiments, the obtaining 902 includes obtaining at least one automatically generated 1028 candidate merge conflict resolution with an associated resolution generator confidence value 708, and the method further includes assigning 912 the candidate merge conflict resolution a recommendation priority 322 based at least in part on the resolution generator confidence value.

For example, if the confidence value is less than a cutoff threshold (e.g., 0.7 out of 1.0, with 1.0 being full confidence 706 in the autogenerated resolution), the embodiment may assign a "reject" priority 322. As a result of this priority, the rejected resolution is not assessed as to buildability, accuracy, or consistency, and is not displayed in the recommendation 306.

More generally, the confidence value indicates how much confidence the model 702 that generated this candidate has in this candidate. Model confidence might not be displayed in the user interface 124, at least not in the recommendation 306 and perhaps not otherwise, because it's often difficult to explain the model's basis for the confidence value. But model confidence could nonetheless be used internally as a criterion for ranking candidate resolutions.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as merge conflict resolution facilitation software 302, resolution recommendations 306, candidate resolutions 304, resolution rankings 320, assessment criteria 308, consistency measures 404, build request responses 512, testing results 614, and resolution generator confidence values 708, in the form of data 118 and instructions 116, read from a removable storage medium 114 and/or another source such as a network connection, to form a configured storage medium. The configured storage medium 112 is capable of causing a computer system 102 to perform technical process steps for merge conflict resolution facilitation, as disclosed herein. The Figures thus help illustrate configured storage media embodiments and process (a.k.a. method) embodiments, as well as system and process embodiments. In particular, any of the process steps illustrated in FIG. 9 or 10, or otherwise taught herein, may be used to help configure a storage medium to form a configured storage medium embodiment.

Some embodiments use or provide a computer-readable storage device 112, 114 configured with data 118 and instructions 116 which upon execution by at least one processor 110 cause a computing system to perform a method for facilitating source code merge conflict resolution. This method includes: obtaining 902 multiple candidate merge conflict resolutions which are each associated with a source code base; assessing 904 each candidate merge conflict resolution using an assessment based on at least two of the following assessment criteria: a buildability criterion, an accuracy criterion, a consistency criterion, or a resolution generator confidence criterion; assigning 912 each respective candidate merge conflict resolution a recommendation priority or a rank or both based at least in part on based on a result of the assessing of said respective candidate merge conflict resolution; and displaying 914 a recommendation of at least one candidate merge conflict resolution based on a result of the priority assigning 912 or ranking 910.

In some embodiments, the assessing 904 is based on at least three of the assessment criteria 308 of the set comprising criteria 312, 314, 316, 318, for at least one of the candidate merge conflict resolutions.

In some embodiments, the assessing 904 is based on at least the consistency criterion 316 for at least one of the candidate merge conflict resolutions.

In some embodiments, the method 1000 further includes: identifying 1038 a gap 620 in test suite code coverage in response to assessing a particular candidate merge conflict resolution; and submitting 1056 a test creation request 814 to a test creation mechanism 816 in response to identifying the gap. That is, an embodiment reporting 914 a testing gap may simultaneously offer to synthesize missing unit tests to remedy the lack of coverage of the merged code.

In some embodiments, the method 1000 further includes: getting 916 a candidate merge conflict resolution selection 920 via a user interface 124; and submitting 918 a conflict resolution request 810 to a conflict resolution mechanism 812 in response to getting the selection. Teachings herein can be applied in situations where merge conflicts are automatically resolved, as well as in situations that include the developer working in a manual resolution flow. For example, an accept changes button can have an indication of the status 614 of a test 608 when the button is pressed to accept the changes made in a candidate resolution 304.

Additional Observations

Additional support for the discussion of source code merge conflict resolution functionality 210 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, or best mode. Any apparent conflict with any other patent disclosure, even from the owner of the present innovations, has no role in interpreting the claims presented in this patent disclosure. With this understanding, which pertains to all parts of the present disclosure, examples and observations are offered herein.

Technical Character

The technical character of embodiments described herein will be apparent to one of ordinary skill in the art, and will also be apparent in several ways to a wide range of attentive readers. Some embodiments address technical activities such as attempting to compile source code 132, software testing 608, and communicating 904, 1004, 1006, 1010, 1014, 1018, 1020, 1056 with various mechanisms 216, 220, 502, 604, 702, 812, 816, 1012, which are each an activity deeply rooted in computing technology. Some of the technical mechanisms discussed include, e.g., source code edit patterns 212, merge conflict resolution facilitation software 302, conflict resolutions 208, 304, particular mechanisms 216, 220, 502, 604, 702, 812, 816, 1012, interfaces 324, assessment criteria 308, and hyperlinks 1054. Some of the technical effects discussed include, e.g., developer access to evidence-based recommendations 306 which identify various strengths and weaknesses of autogenerated 1028 merge conflict resolution candidates 304, candidate 304 optimality rankings 320, increased software developer 104 productivity (e.g., developers review fewer candidates 304, higher quality candidates 304, or both), and greater consistency 214 in changes 134 to source code 103, 132 of a code base 510. Thus, purely mental processes and activities limited to pen-and-paper are clearly excluded. Other advantages based on the technical characteristics of the teachings will also be apparent to one of skill from the description provided.

Different embodiments may provide different technical benefits or other advantages in different circumstances, but one of skill informed by the teachings herein will acknowledge that particular technical advantages will likely follow from particular innovation features or feature combinations.

For example, some embodiments assess 904 each candidate merge conflict resolution 304 using a predefined set of assessment criteria 308, rank 910 the candidate merge conflict resolutions based on a result of the assessing, and display 914 the ranked candidates 320 to a developer with the assessment results. This provides an objective ranking 320 of potential merge conflict resolutions 304 with an explanation of the basis 406, 514, 624 of the ranking, thereby facilitating developer-development software interaction by giving the developer 104 more confidence in the ranking and a clear objective basis for accepting 920 or rejecting particular candidate resolutions 304.

Assessment 904 results also improve software developer productivity by helping developers 104 avoid merges 204 that lead to unnecessary work later. In particular, assessing 904 each candidate merge conflict resolution using a buildability criterion 312 increases productivity by avoiding dead end source code edits during merges 204, e.g., edits that don't compile, don't link, or otherwise fail to build the target software 516. Similarly, assessing 904 each candidate merge conflict resolution using a test suite 610 to implement an execution accuracy criterion 314 increases productivity by avoiding dead end source code edits during merges, e.g., edits that result in code which fails unit tests 608. In addition, assessing 904 each candidate merge conflict resolution using an edit consistency criterion 316 increases productivity by avoiding problematic source code edits during merges, e.g., edits that result in code which departs from an edit pattern 212 and hence is more likely to need additional editing later to restore consistency with the pattern.

Other benefits of particular steps or mechanisms of an embodiment are also noted elsewhere herein in connection with those steps or mechanisms.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to efficiently and effectively select an optimal merge conflict resolution 208 from multiple possible resolutions 304. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, peripherals, software process flows, identifiers, data structures, data selections, naming conventions, notations, control flows, or other implementation choices described herein. Any apparent conflict with any other patent disclosure, even from the owner of the present innovations, has no role in interpreting the claims presented in this patent disclosure.

Note Regarding Hyperlinks

Portions of this disclosure refer to URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have any URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
GUID: globally unique identifier
HTTPS: hypertext transfer protocol, secure
IaaS or IAAS: infrastructure-as-a-service
ID: identification or identity
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface URI: uniform resource identifier
URL: uniform resource locator
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., timesliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Source code merge resolution operations such as building 506 a target software 516, testing 608 software, generating 1028 candidate conflict resolutions 304, communicating 904, 1004, 1006, 1010, 1014, 1018, 1020, 1056 with various mechanisms 216, 220, 502, 604, 702, 812, 816, 1012, and many other operations discussed herein, are understood to be inherently digital. A human mind cannot interface directly with a CPU or other processor, or with RAM or other digital storage, to read and write the necessary data to perform the source code merge resolution facilitation steps 1000 taught herein even in a hypothetical prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein.

Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as ascertaining, assessing, assigning, autogenerating, comparing, displaying, distinguishing, following, formulating, getting, identifying, obtaining, presenting, ranking, receiving, rejecting, showing, submitting, testing, using, utilizing (and ascertains, ascertained, assesses, assessed, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment; includes one or more systems 102
102 computer system, also referred to as a "computational system" or "computing system", and when in a network may be referred to as a "node"
104 users, e.g., user of an enhanced system 202; refers to a human or a human's online identity unless otherwise stated
106 peripheral device
108 network generally, including, e.g., LANs, WANs, software-defined networks, clouds, and other wired or wireless networks
110 processor; includes hardware
112 computer-readable storage medium, e.g., RAM, hard disks
114 removable configured computer-readable storage medium
116 instructions executable with processor; may be on removable storage media or in other memory (volatile or nonvolatile or both)
118 digital data in a system 102
120 kernel(s), e.g., operating system(s), BIOS, UEFI, device drivers
122 tools, e.g., version control systems, cybersecurity tools, software development tools, office productivity tools, social media tools, diagnostics, browsers, games, email and other communication tools, commands, and so on
124 user interface; hardware and software
126 display screens, also referred to as "displays"
128 computing hardware not otherwise associated with a reference number 106, 108, 110, 112, 114
130 source code or other code committed in a version control system, e.g., a repository; digital artifacts
132 source code generally; "code" may refer to source code, object code, executable code, or other digital artifacts embodying instructions 116
134 changes to code, e.g., as represented in a version control system or a potential submission to a version control system
136 cloud, cloud computing environment
202 system 102 enhanced with source code merge conflict resolution facilitation functionality 210
204 computational action of merging a change into a source code; may also refer to the result of such action
206 conflict arising in connection with a merge 204, e.g., incompatible changes to be resolved 208 conflict resolution, e.g., selection of one change 134 that is incompatible with another proposed change 210 source code merge conflict resolution facilitation functionality; may also referred to as source code merge conflict resolution functionality or merge conflict resolution functionality; e.g., software or specialized hardware which performs or is configured to perform resolution candidate assessment 904 and reporting 914, e.g., software 302, or any software or hardware which performs or is configured to perform a method 1000 or a computational source code merge conflict resolution activity first disclosed herein 212 source code edit pattern, as detected by a machine learning model or other automation 214 source code edit pattern consistency, as measured by a machine learning model or other automation 216 source code edit pattern consistency assessment mechanism, e.g., Microsoft PROSE™ code synthesis technology or other technology as configured to identify a pattern of edits and detect a departure from the identified pattern 218 merge conflict resolution assessment mechanism, e.g., one or more of mechanisms 216, 604, 702, 1012, as adapted for merge conflict resolution assessment consistent with the teachings provided herein 220 mechanism generally; software operating via hardware 302 source code merge conflict resolution facilitation software, e.g., software which upon execution in a computing system performs resolution candidate assessment 904 and reporting 914

304 merge conflict resolution candidate; may be autogenerated or coded manually by a developer, or a mixture thereof, e.g., a developer may command an assessment 904 of a candidate that was hand-coded from scratch or assessment 904 of a candidate that was created by editing an autogenerated candidate, but it is expected that many of the resolution candidates assessed 904 will be autogenerated 306 merge conflict resolution recommendation; digital 308 merge conflict resolution assessment criteria generally; digital; as used herein, "criteria" means one or more criterion(s)

310 set of merge conflict resolution assessment criteria for which code implementing the criteria for assessment 904 configure a particular computing system 312 merged code buildability assessment criterion; an example of criteria 308

314 merged code operational accuracy assessment criterion; an example of criteria 308

316 merged code consistency with prior edits assessment criterion; an example of criteria 308

318 resolution candidate generator confidence assessment criterion; an example of criteria 308

320 optimality ranking of resolution candidates 304 based on at least one assessment criterion 308; a given ranking may be a total ordering or a partial ordering; a digital result of a ranking action 910

322 resolution candidate 304 recommendation priority; digital; whereas a ranking 320 involves at least two candidates 304, a priority 322 may apply to zero or more candidates 304 in a given situation 324 interface generally; includes software or hardware or both 400 edit pattern consistency assessment generally, as represented digitally in a computing system 402 interface 324 adapted or configured for communications with a pattern consistency assessment mechanism 216

404 measure of edit pattern consistency; may refer to computational activity of measuring edit pattern consistency or to metric(s) used by a computing system during such activity or to a computational result of such activity 406 basis of a consistency criterion 316, as represented in a computing system and utilizable during a consistency 214 assessment 904

500 buildability assessment generally, as represented digitally in a computing system 502 integrated development environment, e.g., a source code editor, build automation tool, and debugger; includes an example of build mechanisms 1012

504 interface 324 adapted or configured for communications with a build mechanism 1012

506 software build, e.g., compiling and linking code; may refer to computational activity of attempting to build a target 516 in a computing system or to a computational result of such activity 508 build request, e.g., command or other communication to a build mechanism 1012; digital 510 code base; typically includes source code 132, may also include other code; some or all of the code base may be committed source code 130 in a repository or other version control system 512 response to a build request; digital 514 basis of a buildability criterion 312, as represented in a computing system and utilizable during a buildability assessment 904

516 build target, e.g., an application program, kernel 120, tool 122, or portion 602 thereof; software in a computing system 600 merged code operational accuracy assessment generally, as represented digitally in a computing system 602 module, routine, library, API, include file, declarations, source code portion, assembly code portion, object code portion, executable code portion or other software component in a computing system 604 software test mechanism, e.g., automation for performing one or more tests on software as to accessibility, compatibility, correctness, functionality, installation, output comparison, performance, security, or other aspect of a target 516

606 interface 324 adapted or configured for communications with a software test mechanism 604

608 software test; may refer to computational activity of testing software in a computing system, or to a particular portion of a test mechanism 604 or to a computational result of software testing activity 610 suite of software tests in a computing system 612 software generally 614 digital result of one or software tests, e.g., data 118 representing test passage, test failure, presence of testing, or absence of testing 616 test coverage, e.g., which code was exercised by testing 618 measure of test coverage, e.g., a percentage of code covered, or a map identifying which test covered which code; digital 620 testing coverage gap, e.g., digital identification of code not exercised during a test 622 importance, urgency, or other weight given a particular test 608 relative to at least one other test 608; digital 624 basis of an accuracy criterion 314, as represented in a computing system and utilizable during an accuracy assessment 904

700 autogenerated merge conflict resolution assessment generally, as represented digitally in a computing system 702 merge conflict resolution generator, e.g., based on program synthesis technology, machine learning model, or other automation 704 interface 324 adapted or configured for communications with a merge conflict resolution generation mechanism 702

706 confidence of a mechanism 702 in the correctness, completeness, or other characteristic of an autogenerated merge conflict resolution; not necessarily disclosed outside the mechanism 702 itself 708 digital value emitted from a merge conflict resolution generation mechanism 702 representing the mechanism's extent or level of confidence 706

800 some aspects of some recommendations 306

802 work item in a workload management system, e.g., Azure® DevOps Boards software (mark of Microsoft Corporation), GitHub® Issues software (mark of GitHub, Inc.), Jira® software (mark of Atlassian Pty Ltd), and so on, or a "TODO" task within the code itself on linked projects, as seen in some Visual Studio® tools (mark of Microsoft Corporation); digital artifact 804 task or work status, history, provenance, or goal, as described in a digital artifact 802; this description 804 and other digital items discussed herein are considered "in" another digital item if they are reachable from that item by five or fewer navigational actions such as following a hyperlink, scrolling, or pressing a button 806 provenance of a candidate merge conflict resolution, as indicated or extant within a computing system 808 user command, navigation, or other response generally, as represented in a computing system 810 request for resolution of a merge conflict, as represented in a computing system, e.g., a selection or acceptance of a particular resolution 812 merge conflict resolution mechanism, e.g., merge functionality in a version control system 814 software test 608 creation request, as represented in a computing system 816 software test 608 creation mechanism, e.g., a model-based test case generation mechanism 818 digital indication of a provenance 806, in a computing system 900 flowchart; 900 also refers to source code merge conflict resolution methods illustrated by or consistent with the FIG. 9 flowchart 902 computationally obtain one or more merge conflict resolution candidates, e.g., via an API 904 computationally assess one or more merge conflict resolution candidates with respect to one or more assessment criteria 308, e.g., by communicating bidirectionally with an assessment mechanism 216, 502, 604, 702, 1012 through an interface 324; note that computational activity performed within the assessment mechanism itself is not part of a method embodiment unless expressly included, and likewise the assessment mechanism itself is not part of a system embodiment unless expressly included 906 computationally formulate at least a portion of a resolution recommendation 306, e.g., by rejecting 908, ranking 910, assigning 912, or other computational activities which utilize one or more assessment 904 results to compute the recommendation 306

908 computationally reject a candidate resolution without necessarily ever displaying 914 the candidate resolution 910 computationally rank two or more candidate resolutions with respect to one another with regard to one or more assessment 904 results, thereby creating a ranking 320

912 computationally assign a recommendation priority 322 to one or more candidate resolutions, based at least in part on one or more assessment 904 results; priorities 322 may implement software quality control policies 914 computationally display a recommendation 306; may also be referred to as reporting; the display activity may show a user 104 the full recommendation 306 all at once or it may permit viewing the recommendation 306 in parts via user interface 124 navigation; the display may be on a screen 126, in an email or another digital communication directed at a user 104, or be printed on paper, for example 916 computationally get a user selection 920 of zero or more candidate resolutions (selection of zero candidate may be treated as rejection of all offered candidates); performed, e.g., via a user interface 124

918 computationally submit a conflict resolution request 810 to a mechanism 812, e.g., via an API 920 user selection of zero or more candidate resolutions, as represented in a computing system 1000 flowchart; 1000 also refers to source code merge conflict resolution methods illustrated by or consistent with the FIG. 10 flowchart (which incorporates the steps of FIG. 9)

1002 computationally execute code which is configured to implement an assessment criteria subset 1050; a system embodiment may include code configured to implement assessment criteria A, B, and C, but in a given situation only actually exercise (use 1002) the code for criteria A and C, or only use 1002 the code for criteria B and C, or only use 1002 the code for criteria C, for example; a method embodiment uses 1002 which criteria are actually assessed during performance of the method by the method embodiment 1004 computationally submit data 118 to a consistency assessment mechanism 216, e.g., via an interface 402

1006 computationally receive data 118 from a consistency assessment mechanism 216, e.g., via an interface 402

1008 computationally utilize data 118 received 1006 from a consistency assessment mechanism 216, e.g., during an assessment 904

1010 computationally submit data 118 to a buildability assessment mechanism 1012, e.g., via an interface 504

1012 buildability assessment mechanism, e.g., a build automation tool 1014 computationally receive data 118 from a buildability assessment mechanism 1012, e.g., via an interface 504

1016 computationally utilize data 118 received 1014 from a buildability assessment mechanism 1012, e.g., during an assessment 904

1018 computationally submit data 118 to an accuracy assessment mechanism 604, e.g., via an interface 606

1020 computationally receive data 118 from an accuracy assessment mechanism 604, e.g., via an interface 606

1022 computationally utilize data 118 received 1020 from an accuracy assessment mechanism 604, e.g., during an assessment 904

1024 computationally compare data 118 received from an assessment mechanism to an assessment criterion 1026 computationally use data 118 received as an assessment basis 1028 automatically generate a merge conflict resolution 208 offering 1030 computationally show, e.g., on a display 126 in a user interface, a work item description 1032 computationally present, e.g., on a display 126 in a user interface, description of a conflict resolution provenance 806

1034 computationally ascertain that an assessment criterion is met 1036 meet (satisfy) an assessment criterion in a computer system 1038 computationally identify a testing coverage gap, e.g., by tracking which code is or is not exercised during testing 608

1040 computationally distinguish between test failure and test absence, e.g., when displaying testing results 614

1042 test failure; occurs when code is submitted to a test 608 and does not pass that test 1044 test absence; occurs when code is not submitted to any test 608

1046 computationally use weighted tests 608 during assessment 904

1048 computationally weight at least two tests differently from one another during assessment 904

1050 subset of a possibly larger set of assessment criteria 308

1052 computationally follow a hyperlink to a destination 1054 hyperlink, e.g., URI, URL, or a placeholder in an electronic document 1056 computationally submit a test creation request 814 to a mechanism 816, e.g., via an API 1058 any step discussed in the present disclosure that has not been assigned some other reference numeral

CONCLUSION

In short, the teachings herein provide a variety of source code merge conflict resolution functionalities 210 which operate in enhanced systems 202. Some embodiments automatically assess 904 source code 132 merge conflict 206 resolution candidates 304 and then display 914 a resolution recommendation 306 explaining strengths and weaknesses of each candidate 304, e.g., whether it builds 506, which tests 608 its merged code passes or fails, which parts 620 were not tested 608, and whether it is inconsistent 214 with earlier changes 134. Thus informed, a developer 104 can avoid adopting changes 134 which produce merged code 132 that does not build 506 or does not pass tests 608, and avoid merged code 132 that departs from a pattern 212 followed in previous changes 134 to a code base 510. Candidate conflict resolution assessments 904 depend on objective criteria 308 such as merged code buildability 312, operational accuracy 314, edit pattern consistency 316, or conflict resolution generator 702 confidence 706. Candidates 304 may be automatically ranked 910, prioritized 912, or rejected 908 outright by an embodiment. Work item descriptions 804 and candidate provenance 806 may be displayed 914, 1030, 1032 to aid developer selection 920 of an optimal merge candidate 304.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIG. 9 or 10 also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art; innovators are not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computing system which is configured to facilitate source code merge conflict resolution, comprising:
a digital memory;
a processor in operable communication with the digital memory, the processor configured to perform source code merge conflict resolution facilitation steps including: (a) obtaining from a merge conflict resolution generator at least two candidate merge conflict resolutions, the merge conflict resolution generator comprising program synthesis technology, a machine learning model, or other automation, (b) computationally assessing each candidate merge conflict resolution using a computational assessment mechanism and an assessment subset of a predefined set of assessment criteria, the predefined set comprising a buildability criterion, an accuracy criterion, and a consistency criterion, the assessment subset including at least the consistency criterion, (c) computationally ranking at least two candidate merge conflict resolutions relative to one another based on a computational result of the assessing, and (d) computationally displaying a recommendation based on the ranking;
wherein the candidate merge conflict resolutions are associated with a source code base, the computing system further comprises a pattern consistency assessment mechanism interface which is configured as an interface to a pattern consistency assessment mechanism, and wherein the assessing comprises:
submitting to the pattern consistency assessment mechanism interface a candidate merge conflict resolution and at least two committed changes to the source code base;
in response to the submitting, receiving from the pattern consistency assessment mechanism interface a consistency measure which indicates an extent of consistency of the submitted candidate merge conflict resolution with the committed changes; and
utilizing the consistency measure as a basis of the consistency criterion.

2. The computing system of claim 1,
wherein the assessing further comprises obtaining at least one automatically generated candidate merge conflict resolution generator confidence value, and assigning a candidate merge conflict resolution recommendation priority based at least in part on the candidate merge conflict resolution generator confidence value.

3. The computing system of claim 1, wherein the candidate merge conflict resolutions are associated with a source code base, the computing system further comprises an integrated development environment, and the assessing comprises:
submitting a build request to the integrated development environment, the build request requesting an attempt to perform a software build using at least one candidate merge conflict resolution and at least a committed portion of the source code base;
receiving a build request response in response to submitting the build request; and
utilizing the build request response as a basis of the buildability criterion.

4. The computing system of claim 1, wherein the candidate merge conflict resolutions are associated with a source code base, the computing system further comprises a testing interface which is configured as an interface to an automated software testing mechanism, and the assessing comprises:
submitting to the testing interface a candidate software which was built using at least one candidate merge conflict resolution;
in response to the submitting, receiving from the testing interface a testing result which indicates a result of testing of the candidate software by the automated software testing mechanism; and
utilizing the testing result as a basis of the accuracy criterion.

5. A computational method for facilitating source code merge conflict resolution, the method performed by a computing system, the method comprising:
computationally obtaining from a merge conflict resolution generator a candidate merge conflict resolution, the candidate merge conflict resolution associated with a source code base;
computationally submitting the candidate merge conflict resolution and at least a portion of the source code base to a computational pattern consistency assessment mechanism;
in response to the submitting, computationally receiving from the pattern consistency assessment mechanism a consistency measure which indicates an extent of consistency of the submitted candidate merge conflict resolution with the source code base portion;
computationally comparing the consistency measure with a consistency criterion; and
displaying in the computing system a recommendation which associates the candidate merge conflict resolution with a computational result of the comparing.

6. The method of claim 5, further comprising at least one of the following:
assessing the candidate merge conflict resolution using a buildability criterion; or
assessing the candidate merge conflict resolution using an accuracy criterion.

7. The method of claim 5, further comprising:
obtaining at least one additional candidate merge conflict resolution which is also associated with the source code base;
assessing the additional candidate merge conflict resolution using a buildability criterion or an accuracy criterion or both;
ranking at least two candidate merge conflict resolutions relative to one another, thereby producing a resolutions ranking; and
displaying the resolutions ranking.

8. The method of claim 5, wherein the obtaining includes obtaining at least one automatically generated candidate merge conflict resolution.

9. The method of claim 5, wherein displaying the recommendation comprises showing a software development work item description that is associated with the candidate merge conflict resolution.

10. The method of claim 5, wherein displaying the recommendation comprises presenting a provenance indication which indicates a provenance of the candidate merge conflict resolution.

11. The method of claim 5, wherein the method comprises the following after obtaining the candidate merge conflict resolution and prior to submitting the candidate merge conflict resolution and the portion of the source code base to the pattern consistency assessment mechanism:
ascertaining that the candidate merge conflict resolution satisfies a buildability criterion; and then assessing the candidate merge conflict resolution using an accuracy criterion.

12. The method of claim 5, wherein the method further comprises assessing the candidate merge conflict resolution using an accuracy criterion, wherein the accuracy criterion depends on a measurement of code coverage by a test suite.

13. The method of claim 5, wherein the method further comprises:
assessing the candidate merge conflict resolution using an accuracy criterion, wherein the accuracy criterion depends on a measurement of code coverage by a test suite;
identifying a gap in test suite code coverage; and
distinguishing in the recommendation between test failure and test absence.

14. The method of claim 5, wherein the method further comprises assessing the candidate merge conflict resolution using an accuracy criterion, wherein the accuracy criterion depends on a test weight.

15. The method of claim 5, wherein the obtaining includes obtaining at least one automatically generated candidate merge conflict resolution with an associated resolution generator confidence value, and the method further comprises assigning the candidate merge conflict resolution a recommendation priority based at least in part on the resolution generator confidence value.

16. A computer-readable storage device configured with data and instructions which upon execution by a processor cause a computing system to perform a method for facilitating source code merge conflict resolution, the method comprising:
computationally obtaining from a merge conflict resolution generator multiple candidate merge conflict resolutions which are each associated with a source code base;
computationally assessing each candidate merge conflict resolution using a computational assessment mechanism and an assessment based on at least two of the following assessment criteria: a buildability criterion, an accuracy criterion, a consistency criterion, or a resolution generator confidence criterion;

computationally assigning each respective candidate merge conflict resolution a recommendation priority or a rank or both based at least in part on based on a result of the assessing of said respective candidate merge conflict resolution; and displaying in the computing system a recommendation of at least one candidate merge conflict resolution based on a computational result of the priority assigning or ranking.

17. The computer-readable storage device of claim 16, wherein the assessing is based on at least three of the assessment criteria for at least one of the candidate merge conflict resolutions.

18. The computer-readable storage device of claim 16, wherein the assessing is based on at least the consistency criterion for at least one of the candidate merge conflict resolutions.

19. The computer-readable storage device of claim 16, wherein the method further comprises:

identifying a gap in test suite code coverage in response to assessing a particular candidate merge conflict resolution; and submitting a test creation request to a test creation mechanism in response to identifying the gap.

20. The computer-readable storage device of claim 16, wherein the method further comprises:

getting a candidate merge conflict resolution selection via a user interface; and submitting a conflict resolution request to a conflict resolution mechanism in response to getting the selection.

* * * * *